June 13, 1933.  S. PAUL  1,913,408
FASTENING DEVICE
Filed May 5, 1930
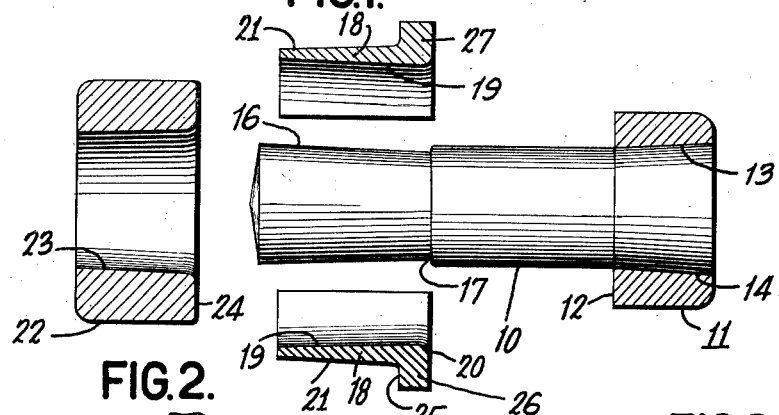
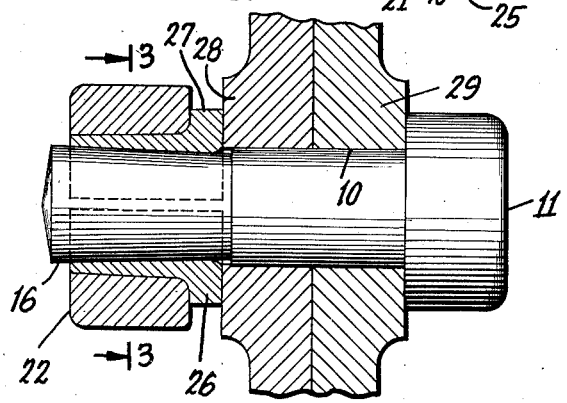
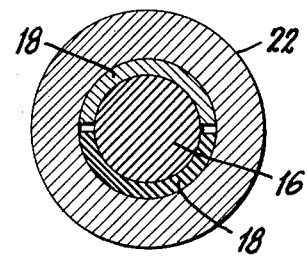
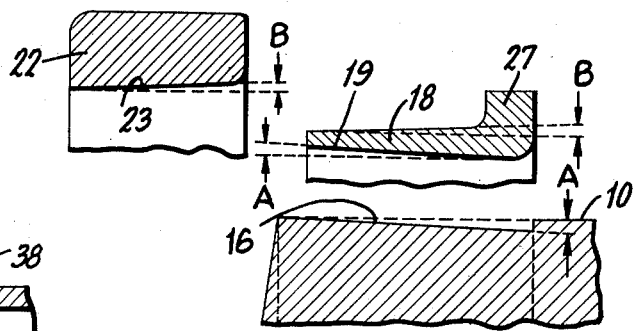
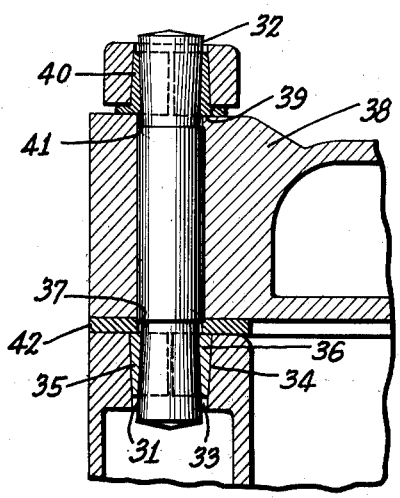
Inventor
Stephen Paul
By his Attorney Patented June 13, 1933

1,913,408

UNITED STATES PATENT OFFICE

STEPHEN PAUL, OF LANSING, MICHIGAN, ASSIGNOR TO PAUL THREADLESS BOLT COMPANY, OF LANSING, MICHIGAN, A CORPORATION OF MICHIGAN

FASTENING DEVICE

Application filed May 5, 1930. Serial No. 449,770.

This invention relates to improvements in the construction of bolts, tie-rods and similar devices for securing or otherwise tying together various machine parts and the like. It has particular reference to the provision of a novel method of securing a nut or other detachable fastening device to the free end of the bolt or rod.

Heretofore it has been the most common practice to provide bolts and the like with threads at one end adapted to receive an internally threaded nut. One serious difficulty which has been encountered in connection with this sort of construction is that the nuts have had a tendency to become loosened and to even completely back off of the end of the bolt as the result of the shocks and vibrations to which machines of all sorts are invariably subjected. This may be explained on the ground that any vibrations transmitted to a bolt of the screw-threaded type will, temporarily at a particular instant in the passage of a vibratory wave, cause a release of the elastic or resilient forces acting between the threads and will at this instant leave the nut free to turn on the bolt. Any slight torque which might be applied at this moment will serve to loosen the nut and subsequently the camming action of the threads themselves may bring about the complete removal of the nut from the bolt. Due to this well known tendency of the ordinary threaded types of fastening, a wide variety of locking devices have been employed with the ordinary nut and these devices have not only added materially to the expense of the fastening unit, but have not been altogether efficient and safe in the performance of their intended function.

An object of the present invention has been to provide a simple, inexpensive and yet effective fastening means which may be applied to the end of a bolt or rod in lieu of the ordinary nut and one which has no threads and accordingly requires no threads at the end of the bolt or rod. The fastening means contemplated may comprise a plurality of members provided with co-operating tapered surfaces inclined at a suitable small angle to the axis of the bolt and adapted for frictional engagement with each other and with the bolt in such a way as to bind the parts together and prevent loosening or removal thereof due to vibrations imparted to the bolt.

A construction embodying some of the characteristics of the fastening device now contemplated is disclosed in my prior Patent No. 1,692,565, granted November 20, 1928. However, the structure disclosed in my prior patent requires application of the bolt while hot to the parts to be secured. The bolt disclosed in the patent is not applicable to the fastening of parts under conditions in which the use of a heated bolt is either objectionable or impracticable. In applying this older form of bolt to a machine or the like, it is contemplated that the bolt should be temporarily elongated by the application of heat to its main body. When the heated bolt is inserted through openings in the parts to be clamped, and a split sleeve, having an interior tapered surface at an angle of about 5 degrees is applied to a correspondingly tapered portion at the end of the bolt, and a collar having a straight, cylindrical, interior surface corresponding to the exterior surface of the split sleeve is then placed over the latter and the bolt is then permitted to contract by cooling, the action of the clamped parts will be to force the split sleeve outwardly and thus produce a wedging action between the tapered portion of the bolt and the interior surface of the collar. To insure against accidental removal of the collar from the sleeve, a pin or similar means may be employed to assist in the retention of the collar. In addition to the objectionable necessity of heating the bolt, it will be apparent that the device disclosed in the patent is applicable only to the fastening of machine parts whose outer surfaces are spaced at a definite distance apart and where no loose play is to be provided between the parts.

The present invention has in view the provision of a threadless bolt of the general type disclosed in the patent but one which may be applied while cold or at normal temperatures and one which may be accommodated to slight variations between the surfaces of the parts to be clamped together. The provision for slight variation in the effective length of the bolt or rod makes it possible to produce a tightening of the connection between the parts whenever this is desirable. Furthermore, the construction contemplated by the present invention is such that it may be employed in a position wherein the head and nut of the bolt will not necessarily tightly clamp two or more machine parts together. The nut or fastening element may be securely attached to the free end of the bolt without relying upon the resilience of the material of the parts being clamped. These parts may, in fact, have a certain amount of loose play, if desired.

In the accomplishment of the foregoing ends, the invention contemplates the provision of a tapered surface on the bolt, tapering inwardly at a slight angle from a point adjacent the end of the bolt toward its middle. A split sleeve, or similar wedging means formed preferably as a plurality of separable elements, having a tapered interior surface corresponding to the taper on the bolt, is adapted to be mounted over this tapered portion of the bolt. The sleeve is preferably provided with an exterior surface having a taper in the opposite direction to that of its interior surface. A collar, having an interior surface with a taper corresponding generally to the exterior taper of the split sleeve is then adapted to be forced over the sleeve to retain the parts in position. The arrangement is such that upon forcibly applying the collar over the outer surface of the sleeve, certain elastic or resilient forces will be set up in the material of the various parts, thereby creating a substantial amount of friction between the surfaces. The friction between the collar and the sleeve will be sufficient to prevent any accidental removal of the collar and may, if desired, be made sufficient to prevent its removal without the application of excessive force. The co-operation of the interior surface of the sleeve with the tapered surface of the rod will, of course, prevent any appreciable outward movement of the collar and sleeve as a unit and any slight movement which may take place will merely serve to increase the resilient and frictional forces between the parts. A particularly advantageous feature of the construction is that vibrations imparted to the bolt or rod from the machine elements to which it may be applied will not serve to release the friction forces but on the contrary will tend to increase these forces and thereby permanently tighten up on the fastening.

It has been found that for best results a rather definite relation should exist between the inclination of the interior surface of the split sleeve and the exterior surface thereof. Preferably the interior surface should be inclined at a comparatively small angle of, say, 1½ degrees so that in providing a sleeve of appropriate length, the diameter of the bolt will not be reduced to an objectionable extent at the smaller end of the taper. It is not even necessary to reduce the diameter at this point to as great a degree as would be the case in cutting threads therein. The taper of the outer surface of the split sleeve or the inner surface of the collar is preferably somewhat greater and may well be 2 or 3 degrees, or more, with respect to the axis of the bolt. It will be found that for a given taper on the inner surface of the sleeve, a definite taper on the outer surface will produce a maximum frictional effect between the collar and sleeve whereas a greater or less exterior taper will produce a reduced frictional effect. This relation will vary more or less directly with the coefficient of friction between the surfaces of the collar and sleeve. If the relation between the two tapers is so selected as to provide for the maximum frictional effect between the collar and sleeve, it may be extremely difficult to remove the collar when it is desired to disconnect the parts joined. For this reason it may be found preferable in practice to adopt a relation of angles which will produce a friction force somewhat less than the maximum.

With this general explanation of the nature of the invention, a detailed description of the same will now be given in conjunction with the accompanying drawing. Numerous objects and advantages, in addition to those already specified, will become more apparent from the detailed description of the invention which follows:

In the drawing Figure 1 is a longitudinal, sectional view of the fastening device with the parts separated.

Figure 2 is a similar sectional view of the parts in assembled position with relation to flanges clamped thereby.

Figure 3 is a transverse sectional view taken along the line 3—3 of Figure 2.

Figure 4 is a diagrammatic illustration of the angular relation between the various tapered surfaces, and, Figure 5 is a sectional assembly view illustrating a modified form of the invention as applied to certain parts to be secured.

Referring now to the drawing, the main body of the fastening device may be comprised by a substantially cylindrical rod 10 having an enlarged head 11 at one end. This head may either be formed as an integral portion of the rod providing a shoulder 12 or it may be in the form of a separate collar having a tapered interior surface 13 adapted to co-operate with a correspondingly tapered surface 14 at the end of the bolt. This separable head construction has the advantage of providing somewhat greater strength for resisting shear along the plane of the surface 12.

Adjacent the free end 15 of the bolt or rod there is provided an inwardly tapering surface 16 having its larger diameter adjacent the outer or free end and its smaller diameter toward the middle of the bolt. This surface may advantageously be inclined at an angle of about 1½ degrees to the axis of the bolt, although a greater or less angle is permissible. It is primarily important that the taper should not be so great as to reduce the diameter of the bolt to such an extent that it is materially weakened at the inner end of the taper. A shoulder 17 between the inner end of the taper and the main body of the bolt will be provided. A split sleeve 18, or similar wedging device, preferably formed in two or more separable sections, is adapted to co-operate with the tapered surface of the bolt. For this purpose the interior surface 19 of the sleeve is tapered to correspond with the taper on the bolt and is adapted to provide a true fit, i. e. complete contact of the interior surface of the sleeve with the exterior tapered surface of the bolt when a shoulder 20 of the sleeve abuts the shoulder 17. It will be apparent that if the elements of the sleeve are shifted slightly to the left in Figure 2 with respect to the bolt, the co-operating tapered surfaces will not conform precisely and there will be a tendency to expand, to a certain extent, the outer surface of the sleeve. This outer surface 21 is, as shown, preferably tapered in the opposite direction from the taper of the interior surface and at either the same or a different angle with respect to the axis of the bolt.

A collar 22 having an interior tapered surface 23 corresponding to the taper of the surface 21 is adapted to be snugly fitted over this exterior surface of the sleeve. The construction is such that in forcing the collar onto the sleeve until the end shoulder 24 engages the shoulder 25 of an upstanding flange 26 of the split sleeve, a considerable resilient or elastic force will be set up in the metal of the collar and sleeve. This resilient force, having a large component in a direction perpendicular to the surfaces 21 and 23, will create a substantial amount of friction between these surfaces, tending to prevent removal of the collar from the sleeve. This frictional reaction may be increased to an even greater extent, if desired, by shifting the sleeve elements outwardly along the tapered surface 16 to a slight extent so that there will not be true co-operation between the surfaces 16 and 19. This, as before stated, will tend to increase somewhat the outer dimension of the sleeve and will bring about an increase in the resilient forces incident to the application of the collar 22. Furthermore by leaving a slight clearance between the shoulders 17 and 20, allowance is made for a certain amount of tightening of the fastening device when it is desired to clamp two flanges or other members rigidly together. Thus a blow applied to the outer end of the collar 22 may serve to drive it onto the outer surface of the split sleeve and at the same time force the latter inwardly until its inner shoulder 27 is squeezed against the flange or other member 28 being bolted, thereby clamping it more tightly against the companion member 29.

It will be apparent that if the members 28 and 29 which are joined by the bolt are intended to have a certain amount of free play between the shoulders 12 and 27, this may readily be permitted since the driving of the collar 22 onto the sleeve will produce a permanent, elastic reaction which will bring about the frictional forces mentioned. As the adjacent member 28 swings or slides against the shoulder 27, it will merely tend to force the sleeve up along the inclination of the taper 16 and will bring about an even greater frictional reaction, which will continue even after the pressure exerted by the member 28 is released.

It has been found that for best results there should be maintained a fairly definite relation between the angle A, Figure 4, which is the angle of inclination of the surfaces 16 and 19 to the axis of the bolt, and the angle B which represents the inclination to this axis of the surfaces 21 and 23. Angle A should preferably be quite small, as for example 1½°, although a greater or smaller angle is permissible. An angle of the type specified will provide for a relatively long, tapering surface 16 without cutting too deeply into the body of the bolt at the smaller end of the taper. The bolt may in this way be left in a stronger condition than if threads were to be cut in the same.

Now, assuming the selection of a definite value for the angle A, it will be found desirable to adopt an angle B having a suitable relation thereto involving as a direct factor the coefficient of friction between the tapered surfaces. Where the bolt and fastening devices are formed of steel, the coefficient of friction may vary somewhat but will usually be found to be between .15 and .25 if the surfaces are clean. It has been determined that where the angle A is 1½° and the coefficient of friction between the surfaces is .15, the angle B should be about 2° and 48′ to provide the maximum locking effect. Where the coefficient of friction is .175, the angle B should, it has been determined, be about 3° and 33′ for maximum locking action while for a coefficient of friction of .2, the angle B, for maximum locking action, should be about 4° and 14′, and should the coefficient of friction be .25, the maximum locking action will be had with an angle B of about 5° and 43′. In each case it will be understood that the angle A is assumed to have the value 1½°. Should the angle A be made larger, the maximum locking effect would take place in each instance with a smaller angle B than that previously specified. While the maximum locking action is obtainable under the conditions specified, it is normally preferable to vary the angle B somewhat from the values mentioned in order that the locking action may not be too strong. It is usually desirable that the fastening devices should be capable of removal when the necessity arises. For this purpose it will usually be found desirable to either increase or decrease the value of the angle B to the desired extent until the locking action is great enough for the intended purposes, but is not so great as to make separation of the parts unnecessarily difficult. Of course where it is intended that the bolt should be permanently applied, as a rivet, the maximum lock is desirable.

Referring to Figure 5, a particular adaptation of the invention has been shown in which a bolt or stud is adapted to extend in a relatively fixed manner from a large casting so that some other part may be bolted to the casting. For example, the invention as here illustrated may be applied to an automobile engine for the purpose of securing the cylinder head to the cylinder block. Thus, a bolt 30, having both of its ends provided with tapered surfaces 31 and 32, may have one end inserted into an opening 33 in a cylinder block. The opening 33 for this purpose should have a tapered wall 34 inclined in the opposite direction to the taper 31 of the bolt. A pair or more of wedge elements 35 and 36, which may constitute in effect a split sleeve, may be forced in between the tapered surfaces of the cylinder block and bolt. Where the wedge devices are in the form of two halves of a complete sleeve, the end of the bolt, together with one of the sections of the sleeve, may be inserted into the hole in the engine block and the other section of the sleeve may then be driven into the opening to complete the frictional engagement of the parts. Or if desired, the two sections of the sleeve may be mounted on the bolt before it is inserted in the opening and both of the sections may then be driven in to provide the frictional engagement of the parts. If the shoulder 37 of the bolt is made to co-operate directly with the upper end of the split sleeve, the unit may be forced as a whole into the opening in the casting. As shown, the sleeve members will preferably be formed without the flange portions so that they may be driven completely into the hole and thus obviate the necessity of counterboring the co-operating face of the cylinder head. When the parts are once inserted in the manner described, it is practically impossible to remove the bolt 30 from the cylinder block. The cylinder head 38 may be placed in the usual way, over the series of bolts carried by the block in the way explained, and the fastening devices, of the type already fully described in connection with Figures 1 to 4, may be applied to the upper ends of the bolts. Forcing of the shoulders 39 of the sleeve sections 40 toward the shoulder 41 of the bolt will provide the desired take-up for tightening of the gasket 42.

While a preferred form of fastening device has been described in considerable detail, it is to be understood that many changes may be made in the particular structure shown without departing from the general spirit and scope of the invention. For example the outer collar might be replaced by a ring, or the like, which would serve to set up the desired elastic and frictional forces. Furthermore, it is to be understood that the features of the present invention are capable of wide application and are not restricted to use in connection with bolts, tie-rods and the like. The terms employed herein have been used merely for the purpose of setting forth one admirable form of the invention and are not to be regarded as imposing any limitations thereon.

What I claim is:

1. A fastening device which comprises a rod of substantially cylindrical form, a tapered surface cut into a portion of said rod, a split sleeve having a correspondingly tapered interior surface and adapted to co-operate with said portion of the rod, said sleeve having a shoulder adapted to engage one of the parts to be fastened and having also a tapered exterior surface, and a member adapted to closely fit over said exterior surface and create a substantial friction therewith to clamp said sleeve and rod together.

2. A fastening device which comprises a rod of substantially cylindrical form, a tapered surface cut into a portion of said rod, a split sleeve having a correspondingly tapered interior surface and adapted to co-operate with said portion of the rod, said sleeve having a shoulder adapted to engage one of the parts to be fastened and having also a tapered exterior surface tapered in the opposite direction from said interior surface, and a collar adapted to closely fit over said exterior surface to clamp said sleeve and rod together.

3. A fastening device which comprises a rod having an enlarged head at one end of substantially cylindrical form, a tapered surface cut into a portion of said rod, a split sleeve having a correspondingly tapered interior surface and adapted to co-operate with said portion of the rod, said sleeve having a shoulder adapted to engage one of the parts to be fastened and having also a tapered exterior surface, and a member adapted to be forced over said sleeve from the free end of said rod and to set up a substantial frictional engagement with said exterior surface to clamp said sleeve and rod together.

4. A fastening device which comprises an elongated rod, a tapered surface adjacent one end of said rod and inclined inwardly toward the middle of the rod, a split sleeve having an interior surface corresponding with said surface of the rod, said sleeve having an exterior tapered surface inclined in the opposite direction from said interior surface, and a member having an interior tapered surface adapted to co-operate with the exterior surface of said sleeve, said rod, sleeve and member being so constructed and arranged as to retain their assembled relation solely by the friction between said tapered surfaces.

5. In a fastening device a rod, a split sleeve adapted to fit around a portion of said rod, and a collar adapted to fit over said sleeve, said rod, sleeve and collar being provided with co-operating smooth tapered surfaces adapted to have sufficient frictional forces permanently set up therebetween to retain the parts in assembled relation, said sleeve and collar being adapted for limited inward movement along said rod but being prevented by said surfaces from outward movement along said rod, and said sleeve having a shoulder adapted to engage one of the parts to be fastened.

6. In a fastening device a bolt having an enlarged head providing a shoulder adjacent one end thereof, an inwardly tapered surface adjacent the opposite end of said bolt, said surface decreasing in dimension toward the first mentioned end, a collar having an oppositely tapered surface adapted to surround said inwardly tapered surface, and a plurality of wedge elements adapted to be forced between the tapered surfaces of said rod and collar, said wedge elements presenting a shoulder facing the shoulder of the enlarged head and adapted to engage one of the parts fastened.

7. In a fastening device a rod, an inwardly tapered surface adjacent one end of said rod, said rod having a smaller cross sectional area at the inner end of said surface than at its outer end, a member having an opening, the surrounding surface of which, has a taper opposite to that of said rod, and wedge means adapted to be forced between the tapered surfaces of said rod and member to prevent separation thereof.

8. In a fastening device a rod having a tapered surface adjacent one end and tapering inwardly toward the opposite end, a split sleeve co-operating with said tapered surface having a correspondingly tapered interior surface and an oppositely tapered exterior surface, and a member adapted to co-operate with said exterior surface to clamp the parts together, the tapers of said interior and exterior surfaces on said sleeve bearing a definite relation to each other to provide a desired locking action between the parts.

In testimony whereof, I have signed my name to this specification this first day of May, 1930.

STEPHEN PAUL.